United States Patent
Yang et al.

(10) Patent No.: US 12,122,045 B2
(45) Date of Patent: Oct. 22, 2024

(54) HANDRAIL AND ROBOT HAVING HANDRAIL

(71) Applicant: SYRIUS ROBOTICS CO., LTD., Guangdong (CN)

(72) Inventors: Zhiqin Yang, Guangdong (CN); Wenli Su, Guangdong (CN)

(73) Assignee: SYRIUS ROBOTICS CO., LTD., Guangdong (CN)

( * ) Notice: Subject to any disclaimer, the term of this patent is extended or adjusted under 35 U.S.C. 154(b) by 33 days.

(21) Appl. No.: 17/926,637

(22) PCT Filed: Mar. 31, 2021

(86) PCT No.: PCT/CN2021/084593
§ 371 (c)(1),
(2) Date: Nov. 21, 2022

(87) PCT Pub. No.: WO2021/232954
PCT Pub. Date: Nov. 25, 2021

(65) Prior Publication Data
US 2023/0202057 A1 Jun. 29, 2023

(30) Foreign Application Priority Data
May 21, 2020 (CN) .......................... 202010440559.1

(51) Int. Cl.
*B62B 7/00* (2006.01)
*B25J 19/00* (2006.01)
*B62B 5/06* (2006.01)

(52) U.S. Cl.
CPC ............... *B25J 19/00* (2013.01); *B62B 5/067* (2013.01)

(58) Field of Classification Search
CPC ........... B62B 5/06; B62B 5/061; B62B 5/064; B62B 5/066; B62B 5/067; B62B 9/20;
(Continued)

(56) References Cited

U.S. PATENT DOCUMENTS 5,039,118 A * 8/1991 Huang ...................... B62B 9/20
403/96
5,056,805 A * 10/1991 Wang ...................... F16C 11/10
280/658
(Continued)

FOREIGN PATENT DOCUMENTS

CN 202029885 U 11/2011
CN 203318476 U * 12/2013
(Continued)

*Primary Examiner* — Chuck Y Mah
(74) *Attorney, Agent, or Firm* — Samson G. Yu

(57) ABSTRACT

The disclosure provides a handrail and a robot having the handrail. The handrail includes a handrail bar, two unlocking pieces and two connecting pieces, the two connecting pieces are spaced apart. The handrail bar includes two connecting ends respectively located on the two ends of handrail bar. The two connecting ends are respectively rotatingly connected to the two connecting pieces, and the two unlocking pieces respectively correspond to the two connecting ends and the two connecting pieces. Each of the two unlocking pieces passes through corresponding connecting end of the two connecting ends and is then inserted into corresponding connecting piece of the two connecting pieces, and is able to move relative to the corresponding connecting piece of the two connecting pieces. Locking blocks are provided on both of the two unlocking pieces, and locking slots are provided on both of the two connecting ends.

18 Claims, 3 Drawing Sheets

(58) Field of Classification Search
CPC .......... B62B 9/203; B62B 3/02; B62B 3/022; B62B 3/027; B62B 2205/20; B25J 19/00; A45C 13/262; A45C 16/429; A45C 16/438

See application file for complete search history.

(56) References Cited

U.S. PATENT DOCUMENTS

| | | | | |
|---|---|---|---|---|
| 5,168,601 | A * | 12/1992 | Liu | B62B 9/20 16/329 |
| 5,765,958 | A * | 6/1998 | Lan | F16C 11/10 403/93 |
| 6,122,981 | A | 9/2000 | Matteo | |
| 6,565,111 | B2 * | 5/2003 | Ageneau | B62B 9/20 280/647 |
| 6,629,801 | B2 * | 10/2003 | Cheng | B62B 9/20 403/96 |
| 8,132,978 | B2 * | 3/2012 | Franklin | F16C 11/10 403/96 |
| 8,186,706 | B2 * | 5/2012 | Dotsey | B62B 7/10 280/47.38 |
| 8,209,816 | B2 * | 7/2012 | Heger | B60R 1/06 16/334 |
| 8,898,862 | B1 * | 12/2014 | McGrath | E05D 11/1007 16/334 |
| 10,047,789 | B1 * | 8/2018 | Mosby | F16C 11/10 |
| 2003/0229966 | A1 * | 12/2003 | Boice | B62B 9/20 16/110.1 |
| 2004/0179891 | A1 * | 9/2004 | Watkins | F16C 11/10 403/96 |
| 2005/0242549 | A1 * | 11/2005 | Longenecker | B62B 9/104 280/642 |
| 2009/0261226 | A1 * | 10/2009 | Branham | B60R 1/0617 248/479 |
| 2019/0270474 | A1 * | 9/2019 | Kiesler | B62B 7/06 |

FOREIGN PATENT DOCUMENTS

| | | | |
|---|---|---|---|
| CN | 203860870 U | 10/2014 | |
| CN | 204510786 U | 7/2015 | |
| CN | 206151035 U | 5/2017 | |
| CN | 207252233 U | 4/2018 | |
| CN | 207644443 U | * 7/2018 | |
| CN | 212193249 U | 12/2020 | |
| GB | 2436815 A | * 10/2007 | .............. B62B 9/20 |
| KR | 20180133269 A | 12/2018 | |

* cited by examiner

A

HANDRAIL AND ROBOT HAVING HANDRAIL

TECHNICAL FIELD

The disclosure relates to the field of robots, and more particularly, to a handrail and a robot having the handrail.

BACKGROUND

At present, handrails for pushing robots in the market are generally of a pull rod structure, which shakes greatly in a using process, so that the feeling of use is very poor.

SUMMARY

Technical Problem

An objective of the disclosure is to provide a handrail and a robot having the handrail, for solving the technical problem that an existing handrail shakes greatly in the using process, so that the feeling of use is very poor.

Technical Solution to the Problem

Technical Solution

The technical purpose of the disclosure is achieved by the following technical solution.

According to an embodiment of the disclosure, a handrail is provided, which includes a handrail bar, two unlocking pieces and two connecting pieces, the two connecting pieces are spaced apart. The handrail bar includes two connecting ends respectively located on two ends of handrail bar. The two connecting ends are respectively rotatingly connected to the two connecting pieces, and the two unlocking pieces respectively correspond to the two connecting ends and the two connecting pieces. Each of the two unlocking pieces passes through corresponding connecting end of the two connecting ends and is then inserted into corresponding connecting piece of the two connecting pieces. Locking blocks are provided on both of the two unlocking pieces, and locking slots are provided on both of the two connecting ends.

When the handrail bar is rotated upwards to be opened, the locking blocks align with the locking slots, and the locking blocks to be inserted into the locking slots, achieving limiting of the handrail bar.

In an embodiment mode, the each of the two unlocking pieces is able to move relative to the corresponding connecting piece of the two connecting pieces to achieve locking of the handrail bar.

In an embodiment mode, two reset springs disposed corresponding to the two unlocking pieces respectively are further included.

When the two unlocking pieces move close to the two connecting pieces, the two reset springs generate elastic deformation. Elastic force generated by elastic deformation of the two reset springs is configured for driving the two unlocking pieces to move away from the two connecting pieces, so that the locking blocks are inserted into the locking slots.

In an embodiment mode, limiting blocks are provided on both of the two unlocking pieces, limiting sheets are provided on both of the two connecting ends, and notches are formed in positions, beside the limiting blocks, of both of the two unlocking pieces.

When the handrail bar needs to be folded from an opened state, the two unlocking pieces are pressed, the two unlocking pieces move close to the two connecting pieces, the limiting blocks move close to the two connecting pieces, the limiting sheets cross the limiting blocks, the limiting blocks move from an outer sides of the limiting sheets to an inner sides of the limiting sheets, the limiting blocks and the limiting sheets are in mutual limiting, so that the two unlocking pieces cannot move away from the two connecting pieces, after the handrail bar is rotated downwards, the limiting blocks and the limiting sheets are staggered, and the two reset springs drive the limiting sheets to be located on the inner sides of the limiting blocks from the outer sides of the limiting blocks through the notches.

In an embodiment mode, each of the limiting blocks is provided with an auxiliary inclined plane, which is convenient for the limiting sheet to cross the limiting block.

In an embodiment mode, each of the two unlocking piece includes a button portion and a limiting rod, each of the locking blocks is located on the limiting rod, the button portion is movably inserted into an outer side of the handrail bar, and the limiting rod passes through the corresponding connecting end of the two connecting end to be inserted into the corresponding connecting piece of the two connecting pieces.

In an embodiment mode, two rotary tables are further included. The two rotary tables and two connecting ends are installed together respectively, and located on two sides of the corresponding connecting pieces respectively.

In an embodiment mode, the handrail bar is provided with a limiting groove configured for being matched with an additional limiting piece for limiting so as to limit upward rotation of the handrail bar.

In an embodiment mode, the handrail bar is provided with two handrail handles, the two handrail handles are spaced apart.

In an embodiment mode, the handrail handle is cylindrical or prismatic.

According to another aspect of the disclosure, a robot is provided, which includes the handrail.

Beneficial Effects of the Disclosure

Beneficial Effects

The disclosure has the following beneficial effects: when the handrail needs to be used, the handrail bar is rotated upwards to be opened, after the handrail bar is rotated to be completely opened, the locking blocks align with the locking slots, and the two unlocking pieces move away from the two connecting pieces to cause the locking blocks to be inserted into the locking slots, thereby achieving limiting and locking of the handrail bar. In the subsequent process of driving the robot to move by pushing the handrail bar, due to the fact that the handrail bar is limited and locked, the handrail bar is unable to further rotate up and down, thereby effectively preventing shaking during use, making use more convenient.

Figure 1:
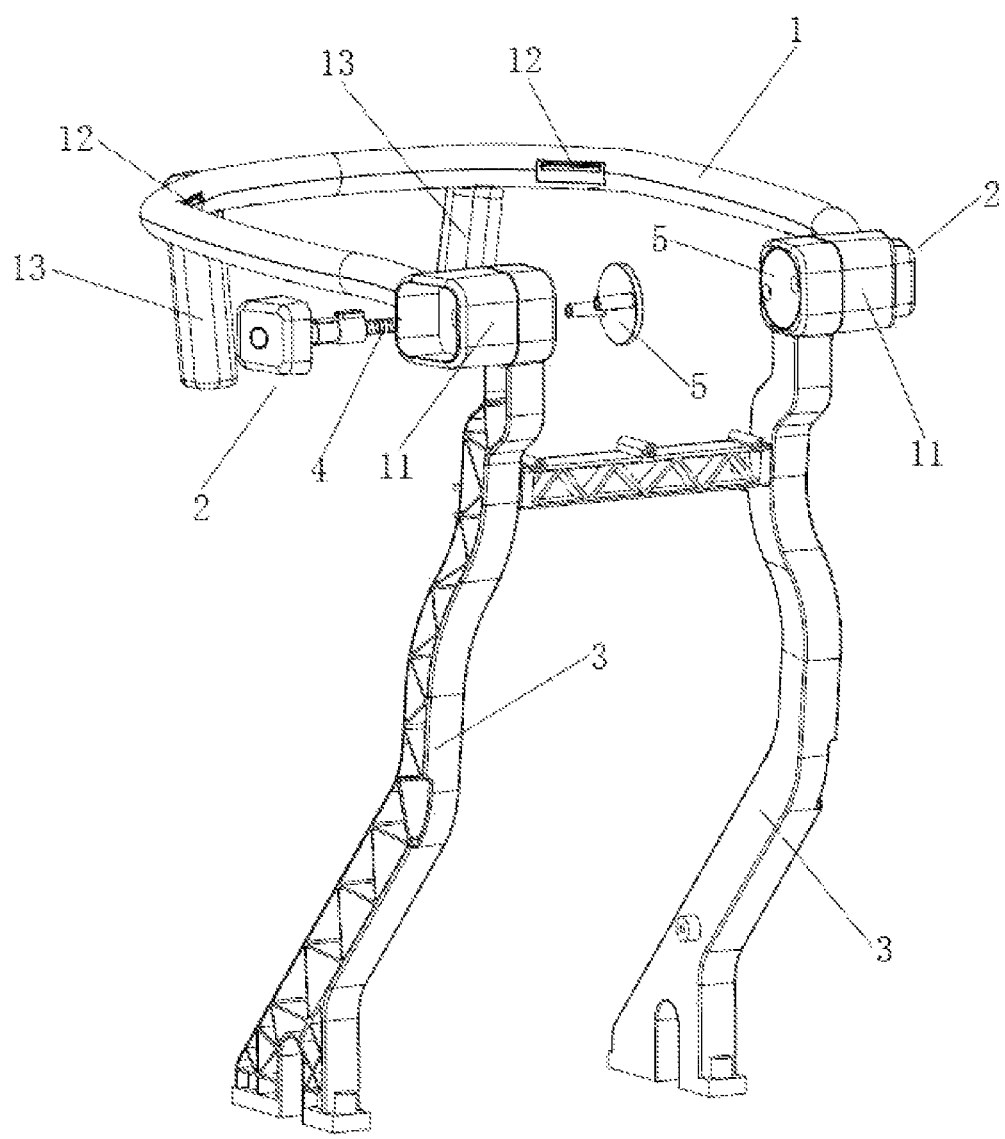
FIG. 1 is a partially exploded schematic structural diagram of a handrail according to an embodiment of the disclosure.

In the drawings, 1. Handrail bar; 11. Connecting end; 111. Locking slot; 112. Limiting sheet; 12. Limiting groove; 13. Handrail handle; 2. Unlocking piece; 21. Button portion; 22. Limiting rod; 221. Locking blocks; 222. Limiting block; 2221. Auxiliary inclined plane; 223. Notch; 224. Avoiding space; 3. Connecting piece; 4. Reset spring; 5. Rotary table.

DETAILED DESCRIPTION OF THE EMBODIMENTS

Embodiments of the Disclosure

In order to make the technical problem, the technical solution and the beneficial effects of the disclosure clearer, the disclosure will be further described in detail below in combination with drawings and embodiments. It is to be understood that the specific embodiments described herein are for the purpose of explaining the disclosure only and are not intended to limit the disclosure.

Figure 2:
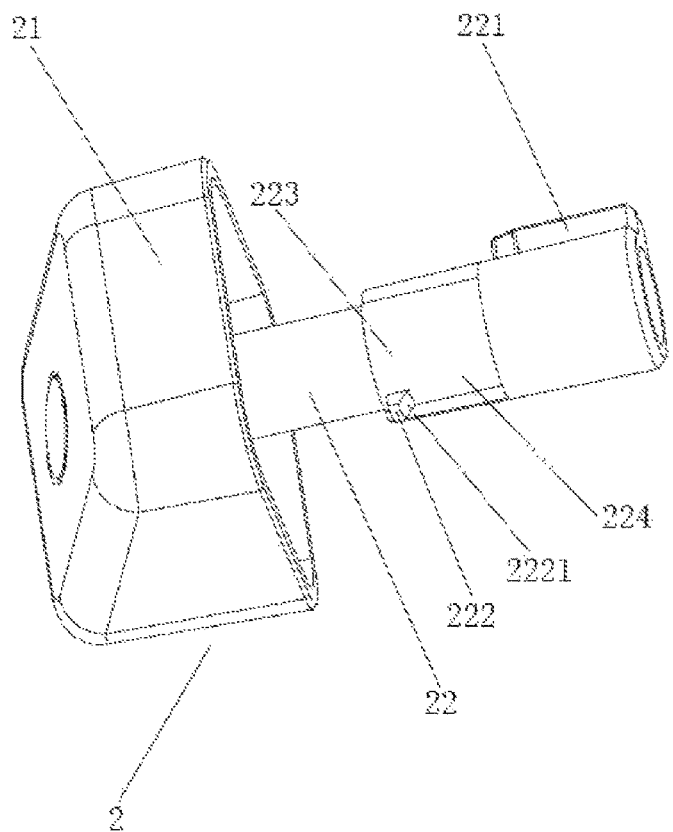
FIG. 2 is a schematic structural diagram of an unlocking piece of a handrail according to an embodiment of the disclosure.
Figure 3:
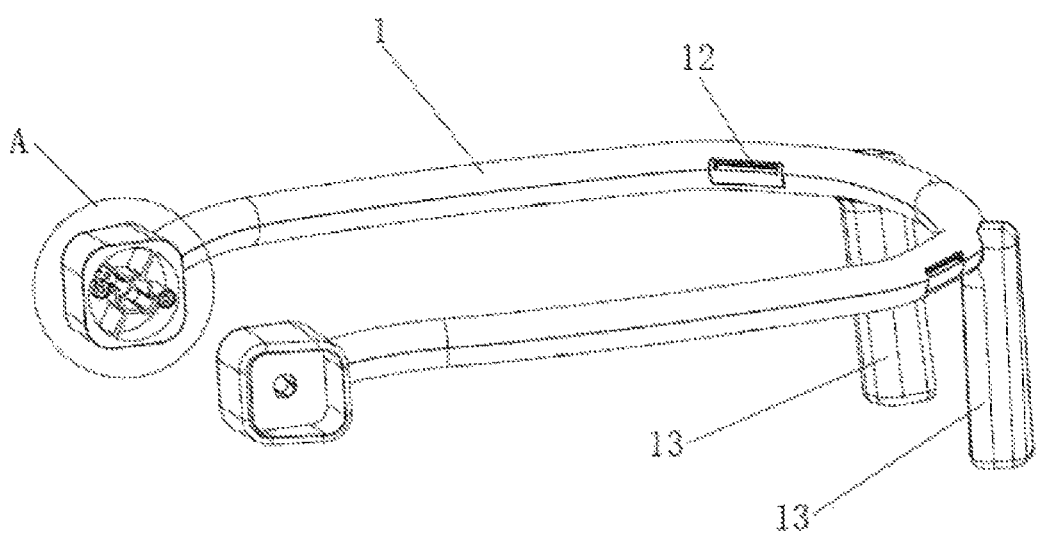
FIG. 3 is a schematic structural diagram of a handrail bar of a handrail according to an embodiment of the disclosure.
Figure 4:
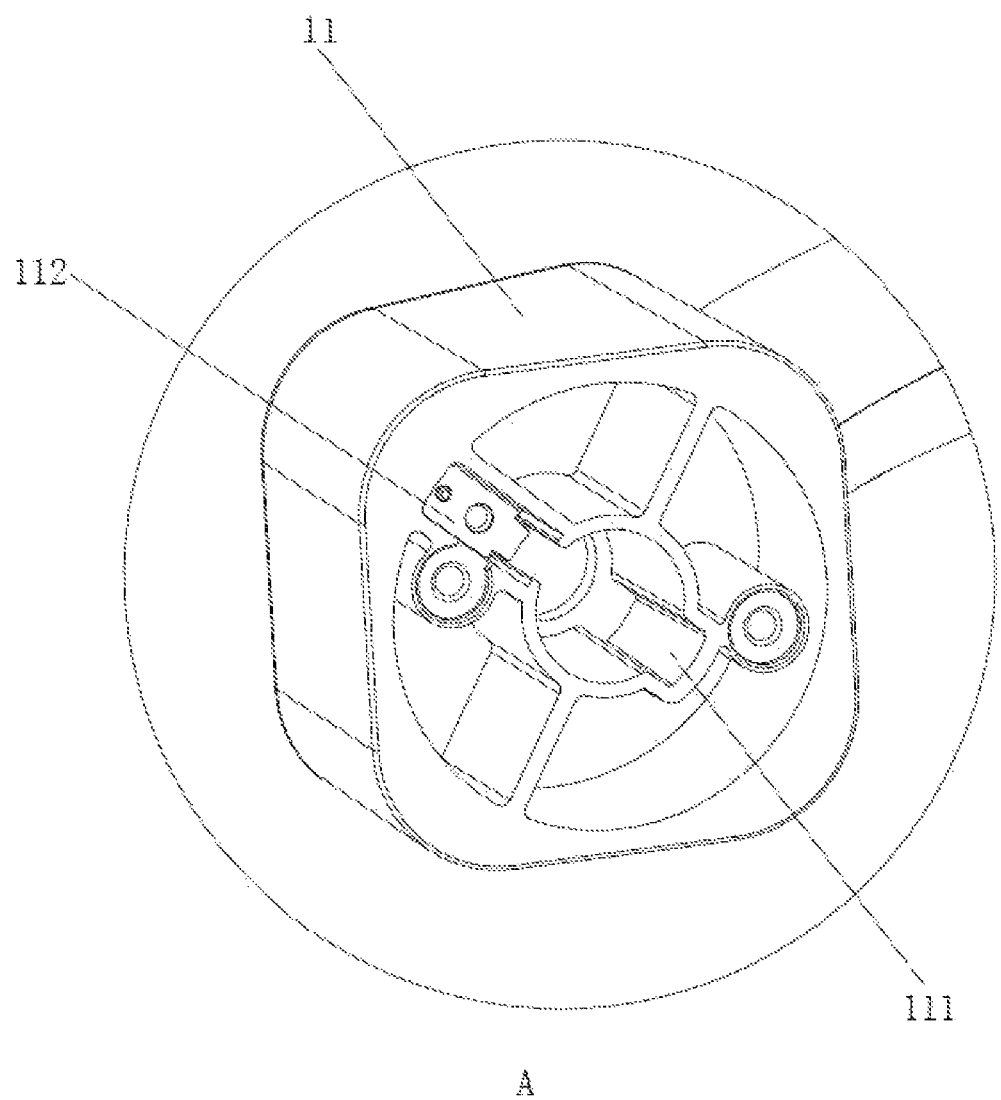
FIG. 4 is an enlarged partial schematic diagram of A in FIG. 3.

The embodiments of the disclosure disclose a robot, which includes a handrail. It is to be noted that the robot in the embodiment can be a cleaning robot and can also be other robots needing to be provided with handrails. As shown in FIG. 1, the handrail includes a handrail bar 1, two unlocking pieces 2 and two connecting pieces 3, the two connecting pieces 3 are spaced apart, the two connecting pieces 3 are configured for installing the handrail on the robot, and the two connecting pieces 3 are generally installed corresponding to two sides respectively. The handrail bar 1 is generally U-shaped or C-shaped, and is also able to be other shapes. The handrail bar 1 includes two connecting ends 11 respectively located on two ends of handrail bar 1. The two connecting ends 11 are respectively rotatingly connected to the two connecting pieces 3, and the two unlocking pieces 2 respectively correspond to the two connecting ends 11 and the two connecting pieces 3. Each of the two unlocking pieces 2 passes through corresponding connecting end of the two connecting ends 11 and is then inserted into corresponding connecting piece 3 of the two connecting pieces, and is able to move relative to the corresponding connecting piece 3 of the two connecting pieces. As shown in FIG. 2, locking blocks 221 are provided on both of the two unlocking pieces 2, and as shown in FIGS. 3 and 4, locking slots 111 are provided on both of the two connecting ends 11. When the handrail needs to be used, the handrail bar 1 is rotated upwards to be opened, after the handrail bar 1 is rotated to be completely opened, the locking blocks 221 align with the locking slots 111, and the two unlocking pieces 2 move away from the two connecting pieces 3 to cause the locking blocks 221 to be inserted into the locking slots 111, thereby achieving limiting and locking of the handrail bar 1. In the subsequent process of driving the robot to move by pushing the handrail bar 1, due to the fact that the handrail bar 1 is limited and locked, the handrail bar 1 is unable to further rotate up and down, thereby effectively preventing shaking during use, making use more convenient. When the handrail needs to be folded after use, the two unlocking pieces 2 are pressed, the two unlocking pieces 2 move close to the two connecting pieces 3 to enable the locking blocks 221 to be separated from the locking slots 111 to achieve unlocking, and the handrail bar 1 can be rotated downwards to be reset.

In the embodiment, as shown in FIG. 1, the handrail further includes two reset springs 4, which are disposed corresponding to the two unlocking pieces 2. As shown in FIGS. 1-4, when the two unlocking pieces 2 move close to the two connecting pieces 3, the two reset springs 4 generate elastic deformation. Elastic force generated by elastic deformation of the two reset springs 4 is configured for driving the two unlocking pieces 2 to move away from the two connecting pieces 3, so that the locking blocks 221 are inserted into the locking slots 111 to realize limiting and locking. When the handrail bar 1 is not completely rotated upwards to be opened, the two reset springs 4 are in an elastic deformation state; when the handrail bar 1 is rotated upwards to be completely opened, the locking blocks 221 align with the locking slots 111, the two reset springs 4 drive the two unlocking pieces 2 to automatically move away from the two connecting pieces 3, the locking blocks 221 are inserted into the locking slots 111 to achieve limiting and locking, and automatic locking is achieved through arrangement of the two reset springs 4; when the handrail needs to be folded after use, the two unlocking pieces 2 are pressed, the two unlocking pieces 2 move close to the two connecting pieces 3, the locking blocks 221 are separated from the locking slots 111, the two reset springs 4 generate elastic deformation, after the handrail bar 1 is rotated downwards, the locking blocks 221 and the locking slots 111 are staggered, and the two connecting ends 11 abut against the locking blocks 221, so that the two unlocking pieces 2 cannot move away from the two connecting pieces 3.

In the embodiment, as shown in FIGS. 1 and 2, each of the two unlocking pieces 2 includes a button portion 21 and a limiting rod 22, the limiting rod 22 is installed on the button portion 21, the locking blocks 221 is disposed on the limiting rod 22, the button portion 21 is movably inserted into the outer side of the handrail bar 1, and the limiting rods 22 pass through the two connecting ends 11 of the handrail bar 1 to be inserted into the two connecting pieces 3. It is to be noted that in the disclosure, the outer side refers to the side relatively far away from the connecting pieces 3, and the inner side refers to the side relatively close to the connecting pieces 3. In the embodiment, the limiting rods 22 of the two unlocking pieces 2 are each provided with a limiting block 222, as shown in FIGS. 3 and 4, the two connecting ends 11 of the handrail bar 1 are each provided with a limiting sheet 112, and the limiting rods 22 of the two unlocking pieces 2 are each provided with a notch 223 and an avoiding space 224 communicating with the notch 223 beside the corresponding limiting block 222. When the handrail bar 1 is in an opened state, the limiting block 222 and the limiting sheet 112 are aligned in the axial direction of the limiting rod 22; when the handrail bar 1 needs to be folded from the opened state, the button portion 21 of the unlocking piece 2 is pressed, the unlocking piece 2 moves close to the connecting piece 3, the locking blocks 221 is separated from the locking slot 111, the limiting block 222 moves close to the connecting piece 3, the limiting sheet 112 crosses the limiting block 222, the limiting block 222 moves to the inner side of the limiting sheet 112 from the outer side of the limiting sheet 112, and due to the mutual limiting effect between the limiting block 222 and the limiting sheet 112, the limiting sheet 112 clamps the unlocking piece 2, in such a case, even if the locking blocks 221 still aligns with the locking slot 111, the elastic force of the reset spring 4 cannot drive the unlocking piece 2 to move away from the connecting piece 3, two hands of a person are able to leave the unlocking piece 2, and after the handrail bar 1 is rotated downwards subsequently to be reset, the limiting block 222 and the limiting sheet 112 are staggered, the elastic force of the reset spring 4 drives the unlocking piece 2 to move a small distance away from the connecting piece 3, so that the limiting sheet 112 is located from the outer side of the limiting block 222 to the inner side of the limiting block 222 through the notch 223; during the upward rotation from the reset state to the completely open state, the limiting sheet 112 rotates relatively in the avoiding space 224. When the limiting sheet 112 and the limiting block 222 are not disposed, pressing of the unlocking piece 2 and downward rotation of the handrail bar 1 needs to be synchronously carried out, otherwise, the unlocking piece 2 is driven by the reset spring 4 to be reset; after the limiting sheet 112 and the limiting block 222 are disposed, pressing of the unlocking piece 2 and downward rotation of the handrail bar 1 are split into two independent actions, after the unlocking piece 2 is pressed once, due to the fact that the limiting sheet 112 clamps the unlocking piece 2, the unlocking piece 2 cannot move to be reset under the condition that the handrail bar 1 does not rotate downwards to be reset, the hands of a person can leave the unlocking piece 2 after one-time pressing, even at a certain time interval, the handrail bar 1 can be rotated freely without pressing the unlocking piece 2 all the time or pressing the unlocking piece 2 again. In this embodiment, the limiting block 222 is provided with an auxiliary inclined plane 2221, and the auxiliary inclined plane 2221 is disposed to facilitate the limiting sheet 112 to cross the limiting block 222 so that the limiting sheet 112 is located from the inner side of the limiting block 222 to the outer side of the limiting block 222.

In the embodiment, as shown in FIG. 1, the handrail further includes two rotary tables 5, the two rotary tables 5 and the two connecting ends 11 of the handrail bar 1 are installed together respectively, and located on two sides of the connecting pieces 3 respectively, and the rotary tables 5 and the button portions 21 of the two unlocking pieces 2 are located on two sides of the two connecting ends 11. When the handrail bar 1 is rotated, the rotary tables 5 rotate in a following way, and the rotary tables 5 are matched with the two connecting ends 11 to achieve that the two connecting ends 11 are rotationally connected to the two connecting pieces 3. In the embodiment, the handrail bar 1 is provided with two limiting grooves 12, the limiting grooves 12 are spaced apart and configured for being matched with an additional limiting piece for limiting so as to limit upward rotation of the handrail bar 1. After the handrail bar resets, the limiting grooves 12 are matched with the additional limiting piece for limiting so as to avoid random upward rotation of the handrail bar 1. In the embodiment, the handrail bar 1 provided with two spaced handrail handles 13, and the handrail is pushed to drive the robot to move by holding the handrail handles 13. The handrail handle 13 is cylindrical or prismatic, and in the prismatic shape, the edges generally need to be rounded for better holding.

The handrail bar 1 in the embodiment has the open state and the reset state, in the using process of the handrail, when the handrail needs to be used, generally from the reset state to the open state, the handrail bar 1 is rotated upwards to the open state, the locking blocks 221 aligns with the locking slot 111, the elastic force of the reset spring 4 drives the unlocking piece 2 to move away from the connecting piece 3, and the locking blocks 221 is inserted into the locking slot 111 to realize limiting and locking of the handrail bar 1; when the handrail needs to be folded after being used, generally, from the open state to the reset state, the unlocking piece 2 is pressed, the unlocking piece 2 moves close to the connecting piece 3, the locking blocks 221 is separated from the locking slot 111, the limiting sheet 112 crosses the limiting block 222, the limiting block 222 moves from the outer side of the limiting sheet 112 to the inner side of the limiting sheet 112, and the handrail bar 1 is rotated downwards to the reset state to be folded.

The above specific embodiments are for the purpose of explaining the disclosure only and are not intended to limit the disclosure, and those skilled in the art, after reading this specification, can make modifications to the above embodiments as required that do not contribute creatively, which are protected by patent laws in the scope of the claims of the disclosure.

INDUSTRIAL APPLICABILITY

According to the handrail and the robot having the handrail provided by the embodiments of the disclosure, when the handrail needs to be used, the handrail bar is rotated forwards to be opened, after the handrail bar is rotated to be completely opened, the locking blocks align with the locking slots, and the two unlocking pieces move away from the two connecting pieces to cause the locking blocks to be inserted into the locking slots, thereby achieving limiting and locking of the handrail bar. In the subsequent process of driving the robot to move by pushing the handrail bar, due to the fact that the handrail bar is limited and locked, the handrail bar cannot rotate up and down any more, thereby effectively preventing shaking during use, and making use more convenient. Therefore, the disclosure has industrial applicability.

What is claimed is:

1. A handrail, comprising a handrail bar, two unlocking pieces and two connecting pieces, the two connecting pieces are spaced apart, the handrail bar comprises two connecting ends respectively located on two ends of handrail bar, the two connecting ends are respectively rotatingly connected to the two connecting pieces, the two unlocking pieces respectively correspond to the two connecting ends and the two connecting pieces, each of the two unlocking pieces passes through corresponding connecting end of the two connecting ends and is then inserted into corresponding connecting piece of the two connecting pieces, locking blocks are provided on both of the two unlocking pieces, and locking slots are provided on both of the two connecting ends, wherein one locking block of the locking blocks is provided on one of the two unlocking pieces, another locking block of the locking blocks is provided on another unlocking piece of the two unlocking pieces, one locking slot of the locking slots is provided on one of the two connecting ends, another locking slot of the locking slots is provided on another connecting end of the two connecting ends;

when the handrail bar is rotated upwards to be opened, the locking blocks align with the locking slots, and the locking blocks to be inserted into the locking slots, achieving movement limiting of the handrail bar, the each of the two unlocking pieces is able to move relative to the corresponding connecting piece of the two connecting pieces to achieve locking of the handrail bar, the handrail bar is provided with a limiting groove configured for being matched with an additional limiting piece for limiting so as to limit upward rotation of the handrail bar.

2. The handrail according to claim 1, wherein further comprising two reset springs disposed corresponding to the two unlocking pieces respectively;

when the two unlocking pieces move close to the two connecting pieces, the two reset springs generate elastic deformation; and elastic force generated by elastic deformation of the two reset springs is configured for driving the two unlocking pieces to move away from the two connecting pieces, so that the locking blocks are inserted into the locking slots.

3. The handrail according to claim 2, wherein limiting blocks are provided on both of the two unlocking pieces, limiting sheets are provided on both of the two connecting ends, and notches are formed in positions, beside the limiting blocks, of both of the two unlocking pieces, one limiting block of the limiting blocks is provided on one of the two unlocking pieces, another limiting block of the limiting blocks is provided on another unlocking piece of the two unlocking pieces, one limiting sheet of the limiting sheets is provided on one of the two connecting ends, another limiting sheet of the limiting sheets is provided on another connecting end of the two connecting ends;

when the handrail bar needs to be folded from an opened state, the two unlocking pieces are pressed, the two unlocking pieces move close to the two connecting pieces, the limiting blocks move close to the two connecting pieces, the limiting sheets cross the limiting blocks, the limiting blocks move from an outer sides of the limiting sheets to an inner sides of the limiting sheets, the limiting blocks and the limiting sheets are in mutual limiting, so that the two unlocking pieces cannot move away from the two connecting pieces, after the handrail bar is rotated downwards, the limiting blocks and the limiting sheets are staggered, and the two reset springs drive the limiting sheets to be located on the inner sides of the limiting blocks from the outer sides of the limiting blocks through the notches.

4. The handrail according to claim 3, wherein each of the limiting blocks is provided with an auxiliary inclined plane, and the auxiliary inclined plane is convenient for the limiting sheet to cross the limiting block.

5. The handrail according to claim 1, wherein each of the two unlocking piece comprises a button portion and a limiting rod, each of the locking blocks is located on the limiting rod, the button portion is movably inserted into an outer side of the handrail bar, and the limiting rod passes through the corresponding connecting end of the two connecting ends to be inserted into the corresponding connecting piece of the two connecting pieces.

6. The handrail according to claim 1, further comprising two rotary tables, and each of the two rotary tables and each of the two connecting ends are installed together respectively, and located on two sides of the corresponding connecting pieces respectively.

7. The handrail according to claim 1, wherein the handrail bar is provided with two handrail handles, the two handrail handles are spaced apart.

8. The handrail according to claim 7, wherein each of the two handrail handles is cylindrical or prismatic.

9. A robot, comprising the handrail according to claim 1.

10. The robot according to claim 9, wherein the each of the two unlocking pieces is able to move relative to the corresponding connecting piece of the two connecting pieces to achieve locking of the handrail bar.

11. The robot according to claim 10, wherein further comprising two reset springs disposed corresponding to the two unlocking pieces respectively;

when the two unlocking pieces move close to the two connecting pieces, the two reset springs generate elastic deformation; and elastic force generated by elastic deformation of the two reset springs is configured for driving the two unlocking pieces to move away from the two connecting pieces, so that the locking blocks are inserted into the locking slots.

12. The robot according to claim 11, wherein limiting blocks are provided on both of the two unlocking pieces, limiting sheets are provided on both of the two connecting ends, and notches are formed in positions, beside the limiting blocks, of both of the two unlocking pieces, one limiting block of the limiting blocks is provided on one of the two unlocking pieces, another limiting block of the limiting blocks is provided on another unlocking piece of the two unlocking pieces, one limiting sheet of the limiting sheets is provided on one of the two connecting ends, another limiting sheet of the limiting sheets is provided on another connecting end of the two connecting ends;

when the handrail bar needs to be folded from an opened state, the two unlocking pieces are pressed, the two unlocking pieces move close to the two connecting pieces, the limiting blocks move close to the two connecting pieces, the limiting sheets cross the limiting blocks, the limiting blocks move from an outer sides of the limiting sheets to an inner sides of the limiting sheets, the limiting blocks and the limiting sheets are in mutual limiting, so that the two unlocking pieces cannot move away from the two connecting pieces, after the handrail bar is rotated downwards, the limiting blocks and the limiting sheets are staggered, and the two reset springs drive the limiting sheets to be located on the inner sides of the limiting blocks from the outer sides of the limiting blocks through the notches.

13. The robot according to claim 12, wherein each of the limiting blocks is provided with an auxiliary inclined plane, and the auxiliary inclined plane is convenient for the limiting sheet to cross the limiting block.

14. The robot according to claim 10, wherein each of the two unlocking piece comprises a button portion and a limiting rod, each of the locking blocks is located on the limiting rod, the button portion is movably inserted into an outer side of the handrail bar, and the limiting rod passes through the corresponding connecting end of the two connecting ends to be inserted into the corresponding connecting piece of the two connecting pieces.

15. The robot according to claim 10, further comprising two rotary tables, and the two rotary tables and two connecting ends are installed together respectively, and located on two sides of the corresponding connecting pieces respectively.

16. The robot according to claim 10, wherein the handrail bar is provided with a limiting groove configured for being matched with an additional limiting piece for limiting so as to limit upward rotation of the handrail bar.

17. The robot according to claim 10, wherein the handrail bar is provided with two handrail handles, the two handrail handles are spaced apart.

18. The robot according to claim 17, wherein each of the two handrail handles is cylindrical or prismatic.

* * * * *